United States Patent

Metral et al.

(10) Patent No.: US 7,778,003 B2
(45) Date of Patent: Aug. 17, 2010

(54) OVERVOLTAGE PROTECTION MODULE AND AN ASSEMBLY OF AT LEAST ONE TELECOMMUNICATIONS MODULE AND AT LEAST ONE OVERVOLTAGE PROTECTION MODULE

(75) Inventors: Guy Metral, Cluses (FR); Guy J. Barthes, Cluses (FR)

(73) Assignee: 3M Innovative Properties Company, St. Paul, MN (US)

( * ) Notice: Subject to any disclaimer, the term of this patent is extended or adjusted under 35 U.S.C. 154(b) by 5 days.

(21) Appl. No.: 11/997,938

(22) PCT Filed: Aug. 2, 2006

(86) PCT No.: PCT/US2006/030112
§ 371 (c)(1),
(2), (4) Date: Feb. 5, 2008

(87) PCT Pub. No.: WO2007/019177
PCT Pub. Date: Feb. 15, 2007

(65) Prior Publication Data
US 2008/0310060 A1    Dec. 18, 2008

(30) Foreign Application Priority Data
Aug. 5, 2005  (EP) ................................ 05017056

(51) Int. Cl.
*H02H 9/04* (2006.01)
(52) U.S. Cl. ..................................................... 361/119
(58) Field of Classification Search ................ 361/119, 361/111, 117, 124
See application file for complete search history.

(56) References Cited

U.S. PATENT DOCUMENTS

| | | | | |
|---|---|---|---|---|
| 4,168,515 A | * | 9/1979 | Baumbach | 361/124 |
| 4,325,100 A | * | 4/1982 | Baumbach | 361/119 |
| 4,477,857 A | | 10/1984 | Crocker | |
| 5,155,649 A | * | 10/1992 | Hung et al. | 361/119 |
| 5,260,994 A | | 11/1993 | Suffi | |
| 5,718,593 A | | 2/1998 | Figueiredo et al. | |
| 6,166,894 A | | 12/2000 | Kane | |
| 6,674,343 B2 | | 1/2004 | Gould et al. | |
| 6,731,489 B2 | * | 5/2004 | Heidorn et al. | 361/119 |
| 2003/0156389 A1 | * | 8/2003 | Busse et al. | 361/736 |

FOREIGN PATENT DOCUMENTS

| | | | |
|---|---|---|---|
| DE | 3905427 A1 | | 8/1990 |
| EP | 0 095 539 A1 | | 12/1983 |
| EP | 1662810 A1 | * | 5/2006 |
| FR | 2662042 | | 11/1991 |
| JP | 2003-102126 A | | 4/2003 |
| WO | WO 99/54965 | | 10/1999 |
| WO | WO 01/61806 A1 | | 8/2001 |
| WO | WO 2004/032533 | | 4/2004 |

* cited by examiner

*Primary Examiner*—Stephen W Jackson
*Assistant Examiner*—Angela Brooks
(74) *Attorney, Agent, or Firm*—Janet A. Kling

(57) ABSTRACT

An overvoltage protection module can be fitted to a telecommunications module having telecommunications contacts, to which telecommunications lines are connectable, and has at least two overvoltage protectors, at least one ground contact, and at least two pairs of protection module contacts for contacting the telecommunications contacts at contact points, so that at least two telecommunications lines are protectable, wherein the contact points are located on at least two different levels, and both contacts of each pair of protection module contacts are connected to the same overvoltage protector.

12 Claims, 2 Drawing Sheets

OVERVOLTAGE PROTECTION MODULE AND AN ASSEMBLY OF AT LEAST ONE TELECOMMUNICATIONS MODULE AND AT LEAST ONE OVERVOLTAGE PROTECTION MODULE

CROSS REFERENCE TO RELATED APPLICATIONS

This application is a national stage filing under 35 U.S.C. 371 of PCT/US2006/030112, filed 2 Aug. 2006, which claims priority to European Patent Application No. 05017056.2, filed 5 Aug. 2005, the disclosure of which is incorporated by reference in its/their entirety herein.

TECHNICAL FIELD

The invention relates to an overvoltage protection module and an assembly of at least one telecommunications module and at least one overvoltage protection module.

BACKGROUND

In the field of telecommunications, numerous customers are connected with the switch of a telecommunications company via telecommunications lines. The customers can also be called subscribers. The switch is also called an exchange or PBX (central office exchange operated by the telecommunications company). Between the subscriber and the switch, sections of the telecommunications lines are connected with telecommunications modules. The telecommunications modules establish an electrical connection between a wire, which is attached to the telecommunications module at a first side, and another wire, which is attached to the telecommunications module at a second side. The wires of one side can also be called incoming wires and the wires of the other side can be called outgoing wires. Plural telecommunications modules can be put together at a distribution point, such as a main distribution frame, an intermediate distribution frame, an outside cabinet or a distribution point located, for example, in an office building or on a particular floor of an office building. To allow flexible wiring, some telecommunications lines are connected with first telecommunications modules in a manner to constitute a permanent connection. Flexibility is realized by so-called jumpers or cross connects, which flexibly connect contacts of the first telecommunications module with contacts of a second telecommunications module. These jumpers can be changed when a person moves within an office building to provide a different telephone (i.e. a different telephone line) with a certain telephone number, which the relocated person intends to keep. In the telecommunications module, disconnection points can be located in the electrical connection between the two sides. At such disconnection points, disconnection plugs can be inserted, in order to disconnect the line. Furthermore, protection plugs and magazines are known. These are connected to the module and protect any equipment connected to the wires from overcurrent and overvoltage. Finally, test plugs can be inserted at a disconnection point in order to test or monitor a line.

Recently, ADSL-technology has spread widely in the field of telecommunications. This technology allows at least two different signals to be transmitted on a single line. This is achieved by transmitting the different signals at different frequencies along the same line. The signals are combined at a particular point in the telecommunications line and split at another point. In particular, at the subscriber side, voice and data signals, which are separate, are combined and sent to the central office via the same line. In the central office the combined signal is split. The voice signal is then directed to the other subscriber(s) on the telephone call, and the data signal is directed to the other subscriber(s) participating in the data exchange. For the transmission of voice and data signals to the subscriber, separate voice and data signals are combined at the central office, sent to the subscriber and split at the subscriber side. After splitting the signal, the so-called POTS-signal (plain old telephone service) can be used to transmit voice signals. The remaining part of the split signal can be used to transmit data, for example. So-called splitters, which are used to split or combine the signal, can generally be arranged at any distribution point.

Any electronic components which are necessary to perform the above functions can be contained, possibly together with a printed circuit board as a base, in a functional module, which can be called a splitter module. Similar functional modules are protection modules, which contain any components which provide protection against overvoltage and/or overcurrent, as well as testing and monitoring modules, which contain suitable electronic components and circuits in order to test and/or monitor a telecommunications line. Furthermore, other functional modules in the above sense are known to those skilled in the art.

EP 0 095 539 A1 describes a line protector for a telecommunications circuit, in which two overvoltage protectors are provided. Through two contacts of the protector, the overvoltage protectors are each connected to one wire of two telecommunications lines. However, as only two contacts are present, only one wire of the telecommunications lines, which each have a wire pair, can be protected.

WO 1999/054965 is related to a protection plug, which provides overvoltage and, in one embodiment, overcurrent protection. The plug is adapted to provide protection for a single telecommunications line.

WO 01/61806 discloses a sub-assembly for protecting telecommunications lines comprising overcurrent and overvoltage protectors. In order to provide protection against overcurrent, contacts are connected through overcurrent protectors. Moreover, a single contact is connected with each overvoltage protector.

SUMMARY OF THE INVENTION

The invention provides an overvoltage protection module which can realize improved protection and can, at the same time, be built in a space saving manner.

The novel overvoltage protection module can be fitted to a telecommunications module. The telecommunications module can comprise a housing. The housing can be made of plastic or any other suitable material and can be constituted by one or more components. The housing serves to accommodate telecommunications contacts, to which telecommunications lines are connectable. The housing can also have specific structures for positioning the contacts therein. Moreover, the housing can comprise one or more cavities or receiving spaces, which are adapted to accommodate the contacts and/or objects such as one or more protection modules described below or any other types of outside modules or parts thereof. Finally, the housing can comprise suitable structures, typically at the outside thereof, to enable the telecommunications module to be mounted to a rack or any other suitable carrier in the field of telecommunications.

The overvoltage protection module can also comprise a housing, which can be formed of one or more housing parts made of plastic or any other suitable material, in order to accommodate the components mentioned below. Moreover, the housing can have one or more projections, grooves or other suitable structures, which cooperate with corresponding structures at the telecommunications module, such as recesses, projections, ridges and/or openings, in order to securely locate the overvoltage protection module when it is fitted to the telecommunications module. Moreover, the overvoltage protection module can comprise one or more projections which serve to allow an easy gripping and handling of the overvoltage protection module in order to fit it to the telecommunications module or remove it there from.

The telecommunications module, to which the overvoltage protection module can be fitted, includes telecommunications contacts, to which telecommunications lines are connectable. As will be apparent to those skilled in the art, a telecommunications line will normally be constituted by a pair of wires, so that the telecommunications contacts are also arranged in pairs. Moreover, telecommunications modules are known in which the telecommunications contacts are arranged in two or more parallel rows, with pairs of contacts being located opposite to each other. Thus, the telecommunications modules can have the shape of a strip.

The overvoltage protection module has at least two pairs of protection module contacts for contacting the telecommunications contacts at contact points. The protection module contacts will, in some instances, simply be called "contacts" in the following description. The contacts can have any suitable shape and structure which allows them to establish electrical contact with the telecommunications contacts. Both the telecommunications contacts and the protection module contacts can be stamped from sheet metal and the sheet metal planes of the telecommunications contacts and the protection module contacts can be substantially parallel or substantially perpendicular to each other when the overvoltage protection module is fitted to the telecommunications module. Moreover, any other angles of orientation between the mentioned sheet metal planes are possible.

The overvoltage protection module, moreover, has at least two overvoltage protectors such as surge arresters. The overvoltage protectors are electrically connected with the protection module contacts. In particular, both contacts of each pair are connected to the same overvoltage protector. In particular, both contacts of one pair of protection module contacts can be directly, i.e. not through an overcurrent protector, be connected with the overvoltage protector. As both contacts of a particular pair of contacts are related to a particular telecommunications line, both wires of this line can be protected against overvoltage. In effect, the telecommunications contacts are connected with the overvoltage protectors, so that in the event that overvoltage is applied to a telecommunications line, such as due to lightning, any devices or equipment which are connected with the telecommunications lines, are protected from overvoltage. This is because the overvoltage protectors are, as will be apparent to those skilled in the art, configured to divert overvoltage to ground.

For this purpose, the overvoltage protectors have ground connections which are suitably connected to at least one ground contact of the overvoltage protection module. The ground contact is, in the state in which the overvoltage protection module is fitted to the telecommunications module, connected with a ground contact of the telecommunications module and/or a carrier, to which the telecommunications module is fitted. The ground contact of the telecommunications module can be connected with the carrier, and the carrier will eventually be connected with ground in order to allow overvoltage to be diverted to ground.

With the described structure of the overvoltage protection module having at least two pairs of contacts and at least two overvoltage protectors, at least two telecommunications lines are protected against overvoltage. This provides, as compared to the known modules, improved protection against overvoltage, because the protection module contacts are connected with both wires of the telecommunications lines, i.e. two telecommunications lines, so that full protection of all wires can be achieved. The overvoltage protection module particularly shows its advantages when it is applied in a remote distribution point, such as an outside cabinet, which can be relatively close to the subscriber. In such a situation, the danger of lightning striking telecommunications lines close to the cabinet is relatively high, and efficient protection can, particularly in such a case, be provided by the overvoltage protection module described herein. Also when a splitter circuit is provided close to a point in the telecommunications line, where the risk of lightning is high, the relatively costly splitter circuit can efficiently be protected. In other words, an inexpensive protection module rather than the expensive splitter circuit could be replaced in the event of overvoltage occurring in the lines.

At the same time, the novel overvoltage protection module can be built in a space saving manner, because the contact points, at which the protection module contacts are in electrical contact with the telecommunications contact, are located on at least two different levels. Thus, not all of the protection module contacts are arranged on a single level, i.e., in a single plane or row adjacent to each other, which would increase the width of the module. Rather, by arranging or stacking the protection module contacts on at least two different levels, the protection module can be built compactly and with a relatively small width. In particular, pairs of contacts can be arranged opposite each other in the overvoltage protection module. This allows telecommunications lines, which are connected with opposite pairs of telecommunications contacts in the telecommunications module, to be protected. Particularly, in connection with splitter modules, opposite pairs of contacts are in the interior of the telecommunications module or by a splitter module, which is fitted to the telecommunications module, indirectly connected. For example, the contact of a first pair can be adapted to transmit a POTS signal, and the contacts of an opposite pair can be adapted to transmit a line signal. The overvoltage protection module described herein provides separate protection for both the POTS and the line contacts in a compact manner. In particular, due to the fact that the overvoltage protection module has at least two overvoltage protectors and at least two pairs of contacts, at least two telecommunications lines are protectable by the novel, space-saving protection module.

At least one of the overvoltage protectors can have two protector contacts and one ground connection. In other words, a three-pole protector, also called three-pole surge arrester, can be provided to efficiently achieve the desired protection. As an alternative, the contacts of one pair of protection module contacts can be connected with two two-pole protectors, which form a protector assembly corresponding to a single three-pole protector as mentioned above.

The overvoltage protection module can be formed particularly space-saving and compact, when the overvoltage protectors are aligned on a common centerline. This allows a relatively narrow shape of the protection module and is compatible with the pitch, at which the telecommunications contacts are arranged in the telecommunications module, to which the protection module can be fitted. As will be apparent, any alternative orientations of the overvoltage protectors are possible and it provides advantages regarding the required space and the compatibility with the pitch of the telecommunications contacts when the overall width of the overvoltage protection module corresponds to the pitch of telecommunications contacts or is even smaller.

Generally, the overvoltage protection module is not limited to a specific number of overvoltage protectors and telecommunications lines to be protected. However, in order to achieve versatility when a telecommunications module is to be equipped with the overvoltage protection module, it has been found advantageous to form the protection module with two pairs of contacts and two overvoltage protectors. The contacts of a first pair, of which the contact points are on a first level, are connected to the first overvoltage protector, and the contacts of a second pair, with their contact points being arranged on a second level, are connected to a second overvoltage protector. In this context, it is to be noted that a telecommunications module, to which plural telecommunications lines can be connectable, might not be used to connect telecommunications lines with all of the module's contacts from the very beginning. Rather, some telecommunications lines might be connected with the telecommunications module at a later point in time. Moreover, even if telecommunications lines are connected with all of the telecommunications module's contacts, not all of these lines might be equipped with additional functions, such as those provided by splitter circuits, or be connected with equipment, which requires protection against overvoltage. With the above-described embodiment of the overvoltage protection module, only those lines, which are actually connected and require protection, can be connected with the overvoltage protection module. Thus, there is no need to invest in many protection modules or a large protection module, but the investment in a growing number of small modules can be made at that time, when it is actually necessary.

The electrical connections can efficiently be separated from each other and the overvoltage protection module can still be kept compact, when the contact points of the protection module contacts are located on a first and a second level, and a ground contact point of at least one ground contact is located on a third level. Thus, the electrical connection to ground is advantageously somewhat separated from the other connections, and a narrow size can be maintained.

The overvoltage protectors can be arranged on at least one printed circuit board provided in the overvoltage protection module, in order to form a solid base for these and, for example, efficiently connect the overvoltage protectors with the contacts of the overvoltage protection module by printed connectors. Naturally, alternatives for the described connections, such as direct wiring, will be apparent to those skilled in the art.

Generally, the overvoltage protection module can provide additional protection, such as protection against overcurrent and/or additional protection against overvoltage, for example, of a different level. However, it can be advantageous if the overvoltage protection module lacks overcurrent protection in order to keep the module as compact as possible. In particular, in this case, when the overvoltage protection module has no overcurrent protection, the module can have a single overvoltage protector such that the overvoltage protection module then provides protection only against overvoltage. Moreover, a single telecommunications line can be protected or only one contact of a pair of contacts can be connected with the overvoltage protector. The above modification is to be considered a part of the present disclosure.

As will be apparent from the above, the overvoltage protection module described herein exhibits its protection functions in combination with a telecommunications module. Therefore, an assembly of at least one telecommunications module and at least one overvoltage protection module, as described herein, is to be considered as part of the invention. In this context, the telecommunications module can be formed so as to allow a plurality of overvoltage protection modules as described herein, to be fitted thereto.

The overvoltage protection module can be used particularly efficiently when its contacts are connectable with two first telecommunications contacts of the telecommunications module, which are adapted to transmit a POTS signal, and two second telecommunications contacts opposite the first telecommunications contacts, which are adapted to transmit a line signal. This represents a currently envisaged use of the novel overvoltage protection module. However, it is to be emphasized that the telecommunications module can also have POTS and DSLAM contacts, line and DSLAM contacts and even two pairs of DSLAM contacts opposite each other, so that also these combinations of telecommunications lines can be protected by the novel overvoltage protection module.

BRIEF DESCRIPTION OF THE DRAWINGS

Hereinafter the invention will be described by a non-limiting example thereof with reference to the drawings, in which.

DETAILED DESCRIPTION OF A PREFERRED EMBODIMENT OF THE INVENTION

Figure 1:
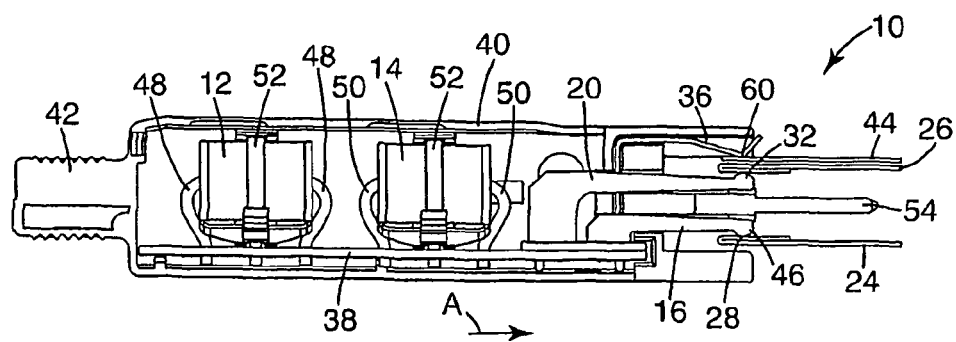
FIG. 1 shows a sectional side view of an embodiment of the overvoltage protection module.

FIG. 1 shows a sectional side view of the overvoltage protection module 10, in which the internal components described below are accommodated in a housing, of which a first housing part 40 can be seen in FIG. 1. At one end thereof, the housing part 40 has, in the embodiment shown, a projection 42 which serves to provide a gripping structure in order for a user to handle the overvoltage protection module during its fitting to or removal from a telecommunications module (the telecommunications module is not shown in FIG. 1). Telecommunications contacts of the telecommunications module (not shown) are denoted with 24 and 26. Moreover, a ground bar 44 of the telecommunications module is shown.

The above-mentioned contacts 24, 26 and ground bar 44 of the telecommunications module are each connected with contacts of the overvoltage protection module 10. In particular, overvoltage protection contact 16 is, in the fitted state of the overvoltage protection module 10, connected with the telecommunications contact 24, protection module contact 20 is connected with the telecommunications contact 26, and a ground contact 36 of the overvoltage protection module is connected with the ground bar 44. In the embodiment shown, the telecommunications contacts 24, 26 are folded upon themselves at their free ends and, thus, have a sheet metal plane from which they are stamped, which is substantially perpendicular to the plane of the drawing of FIG. 1. The sheet metal plane of the protection module contacts 16, 20 is, for the embodiment shown, substantially parallel to the plane of the drawing. In the case shown, the protection module contacts 16, 20 substantially have the shape of an L, with a rounded projection 46 being formed at the free end of the longer leg of each contact 16, 20. The rounded projection 46 is each oriented so as to project towards the telecommunications contact 24, 26 so that these are contacted at contact points 28, 32. As shown in FIG. 1, these contact points 28, 32 are on different levels.

It is also shown in FIG. 1, that the ground contact 36 is formed as a spring tab which resiliently contacts the ground bar 44, in order to provide a reliable electrical connection. As regards the ground contact 36, its sheet metal plane is substantially perpendicular to the plane of the drawing. Moreover, at the free end contacting the ground bar 44, the ground contact is formed in a flat, substantially V-type shape, in order to define a contact point 60.

Both the protection module contacts 16, 20 and the ground contact 38 are connected with a printed circuit board (PCB) in a suitable manner, for example, by soldering pins thereof, which are inserted into openings of the PCB. Other suitable methods will be apparent to those skilled in the art. Moreover, in the embodiment shown, the PCB 38 is provided with printed connectors (not visible in the drawings) for connecting the protection module contacts 16, 20 and the ground contact 38 with overvoltage protectors 12, 14. Both overvoltage protectors 12, 14 are of a three-pole type, i.e., they each have two protector contacts 48, 50 and one ground connection 52. As will be apparent to those skilled in the art, the overvoltage protectors 12, 14 will divert any overvoltage, which is applied to either protector contact 48, 50, to ground via their ground connection 52. Both the ground connection 52 and the protector contacts 48, 50 are connected, for example, by soldering with printed connectors on the PCB 38 in the embodiment shown. Moreover, in the embodiment shown, the protector contacts 48 of the first overvoltage protector 12 are connected with a first pair of protection module contacts 16, 18 (see FIG. 2 for the second contact 18 of this pair). Moreover, the protector contacts 50 are, in the embodiment shown, connected with the protection module contacts 20, 22 (see FIG. 2) of a second pair.

As shown in FIG. 1, the overvoltage protectors 12, 14 have, in the embodiment shown, a substantially cylindrical shape and are aligned along a common center line which extends, in the embodiment shown, substantially parallel to the PCB 38 and parallel to the direction A, in which the overvoltage protection module 10 is insertable into a telecommunications module. In this context, a projection 54 is shown in FIG. 1, which supports in locating the overvoltage protection module on the telecommunications module when it is fitted thereto.

Figure 2:
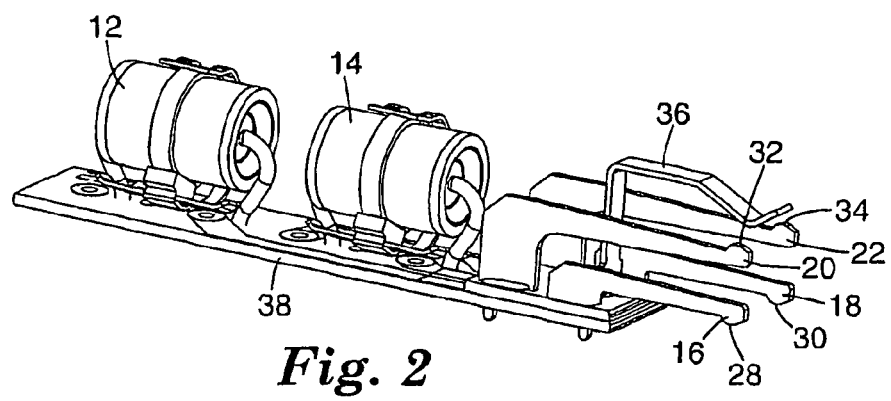
FIG. 2 shows a perspective view of the interior of the overvoltage protection module of FIG. 1.

In FIG. 2, the internal structure of the overvoltage protection module is additionally shown. As compared to FIG. 1, all protection module contacts 16, 18 and 20, 22 of two pairs of contacts are shown. These contacts are arranged so as to locate the contact points 28, 30 and 32, 34 on different levels. In particular, two separate telecommunications lines connected with pairs of telecommunications contacts (of which contacts 24 and 26 are visible in FIG. 1) opposite each other can be protected by the novel overvoltage protection module. Moreover, the ground contact point 60 of ground contact 38 is arranged on a third level in the embodiment shown.

Figure 3:
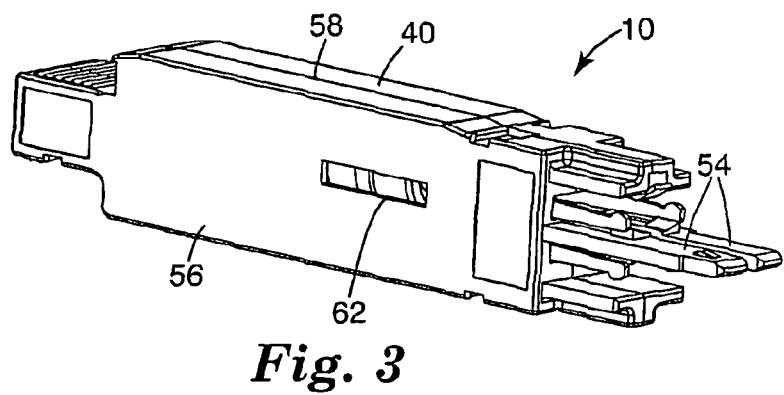
FIG. 3 shows a perspective view of the overvoltage protection module of FIGS. 1 and 2.

FIG. 3 shows the overvoltage protection module 10 with both housing parts 40 and 56 being provided in order to provide, apart from viewing window 62, a closed housing. In the embodiment shown, the housing parts 40, 56 meet along a joint 58 which also extends in the insertion direction A (see FIG. 1) and substantially parallel to the plane of the drawing of FIG. 1. As can be taken from the right part of FIG. 3, two projections 54 are provided in order to securely locate the overvoltage protection module 10, when it is fitted to a telecommunications module. On this end, the overvoltage protection module further includes structures, for example, grooves and recesses, which can be seen in FIG. 3 and also serve to cooperate with corresponding structures at the telecommunications module in order to position the overvoltage protection module thereon.

Figure 4:
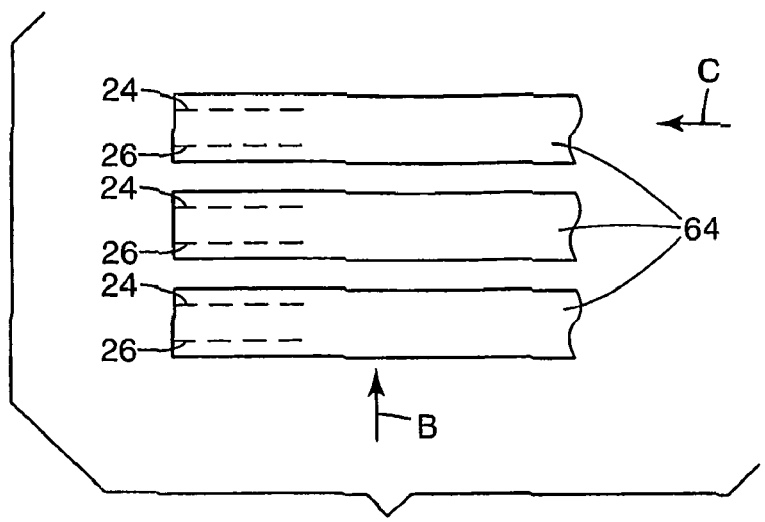
FIG. 4 shows a schematic front view of a number of telecommunications modules.

FIG. 4 shows in a schematic front view parts of three telecommunications modules 64 which each have, in the embodiment shown, a strip-like appearance. Parallel to the extension of the "strip", i.e. from left to right, rows of telecommunications contacts 24, 26 extend.

Figure 5:
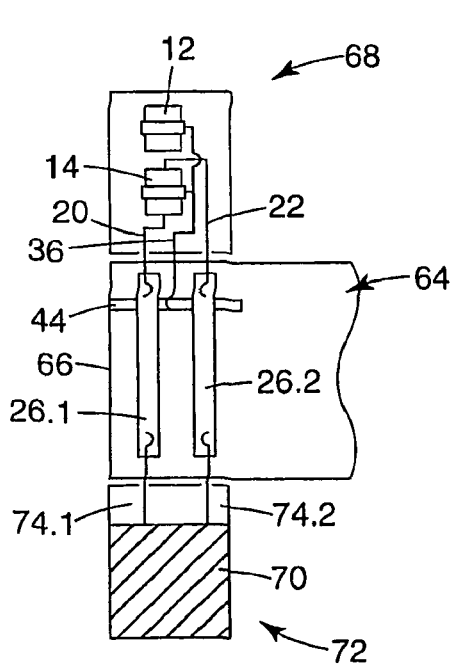
FIG. 5 shows a schematic and partially cut side view of an assembly including a telecommunications module of FIG. 4.

As shown in FIG. 5, which is a side view from direction B in FIG. 4, the overvoltage protection module 10 is, in any suitable manner, attached to or inserted into the telecommunications module 64. In particular, in the embodiment shown, the protection module contacts, of which contacts 20 and 22 are visible in FIG. 5, extend into the housing 66 of the telecommunications module 64 so as to contact telecommunications contacts 26.1 and 26.2. Thus, the protection is applied to both telecommunications contacts 26 and both wires of a wire pair, which constitutes the telecommunications line (not shown), are connected with telecommunications contacts 26. Moreover, in the embodiment shown, ground contact 36 of the overvoltage protection module 10, which is connected with both overvoltage protectors 12, 14, is connected with the ground bar 44 of the telecommunications module 64, which extends along plural or all of the telecommunications modules 26. It is also shown in FIG. 5, that the overvoltage protection module 10 can be fittable from a front side 68, and a splitter module 70 can be fittable to the telecommunications module 64 from a rear side 72. In order to establish the necessary electrical connections to "split" or "combine" a signal, splitter contacts 74.1 and 74.2 are connected with telecommunications contacts 26.1 and 26.2.

Figure 6:
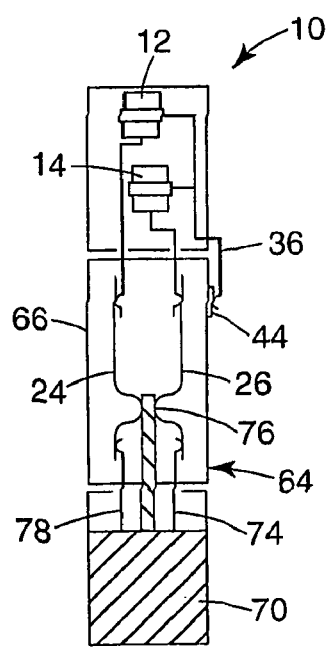
FIG. 6 shows a schematic and partially cut second side view of the assembly of FIG. 5.

FIG. 6 shows the assembly of FIG. 5 from direction C in FIG. 4. It is shown in FIG. 6, that, in the embodiment shown, ground bar 44 extends along the outside of the housing 66 of telecommunications module 64. Moreover, in the embodiment shown, overvoltage protector 12 is connected with telecommunications contacts 24, and the second overvoltage protector 14 is connected with the telecommunications contacts 26. In a state, in which the splitter module 70 is not inserted, the telecommunications contacts 24, 26 can be connected at disconnection point 76. However, as shown in FIG. 6, when the splitter module 70 is inserted, this connection at disconnection point 76 is disconnected, and the telecommunications contacts 24, 26 are separately connected with splitter contacts 74 and 78.

The present invention has now been described with reference to an embodiment thereof. The foregoing detailed description and embodiment have been given for clarity of understanding only. No unnecessary limitations are to be understood there from. For example, all references to directions are exemplary only and do not limit the claimed invention. It will be apparent to those skilled in the art that many changes can be made to the embodiment described without departing from the scope of the invention. Thus, the scope of the present invention should not be limited to the exact details and structures described herein, but rather by the structures described by the language of the claims, and the equivalents of those structures.

The invention claimed is:

1. An overvoltage protection module, which can be fitted to a telecommunications module having telecommunications contacts, to which telecommunications lines are connectable, having:
   at least two overvoltage protectors, at least one ground contact, and
   at least two pairs of protection module contacts for contacting the telecommunication strip at contact points,
   so that at least two telecommunications lines are separately protectable, wherein a first line of the at least two telecommunication lines carries the POTS signal and a second line of the at least two telecommunication lines carries the line signal,
   wherein the ground contact and the protection module contacts extend from an end of the overvoltage protection module, and wherein the contact points are located on at least two different levels, and
   both contacts of each pair of protection module contacts are connected to the same overvoltage protector.

2. The overvoltage protection module in accordance with claim 1, wherein at least one overvoltage protector has two protector contacts and one ground connection.

3. The overvoltage protection module in accordance with claim 1, wherein the overvoltage protectors are aligned on a common centerline.

4. The overvoltage protection module in accordance with claim 1, wherein the module has two pairs of protection module contacts, and two overvoltage protectors, wherein the contacts of a first pair, of which the contact points are located on a first level, are connected to a first overvoltage protector and the contacts of a second pair, of which the contact points are located on a second level, are connected with a second overvoltage protector.

5. The overvoltage protection module in accordance claim 4, wherein the contact points are located on a first and a second level, and at least one ground contact has a ground contact point, which is located on a third level.

6. The overvoltage protection module in accordance with claim 1, wherein the overvoltage protectors are arranged on at least one printed circuit board.

7. The overvoltage protection module in accordance with claim 1, lacking overcurrent protection.

8. An assembly of at least one telecommunications module and at least one overvoltage protection module in accordance with claim 1.

9. The assembly in accordance with claim 8, wherein the telecommunications module has two first telecommunications contacts, which are adapted to transmit a POTS signal and two second telecommunications contacts opposite the first telecommunications contacts, which are adapted to transmit a line-signal.

10. The overvoltage protection module in accordance with claim 1, wherein the at least two pairs of protection module contacts are arranged opposite each other.

11. The overvoltage protection module in accordance with claim 1, wherein each telecommunication line comprises a pair of wires and wherein each wire of each telecommunication line is protected by the at least two overvoltage protectors.

12. The overvoltage protection module in accordance with claim 1, wherein each of the at least two overvoltage protectors is a three-pole surge arrester.

* * * * *

UNITED STATES PATENT AND TRADEMARK OFFICE
CERTIFICATE OF CORRECTION

PATENT NO. : 7,778,003 B2  Page 1 of 1
APPLICATION NO. : 11/997938
DATED : August 17, 2010
INVENTOR(S) : Guy Metral It is certified that error appears in the above-identified patent and that said Letters Patent is hereby corrected as shown below:

In the Claims: Column 10, Claim 5,
Line 4, after "accordance" insert -- with --.

Signed and Sealed this

Ninth Day of November, 2010

David J. Kappos
*Director of the United States Patent and Trademark Office*